(12) United States Patent
Pang et al.

(10) Patent No.: US 8,332,628 B2
(45) Date of Patent: Dec. 11, 2012

(54) METHOD FOR ACCESSING DATA SAFELY SUITABLE FOR ELECTRONIC TAG

(75) Inventors: Liaojun Pang, Shaanxi (CN); Jun Cao, Shaanxi (CN); Manxia Tie, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 179 days.

(21) Appl. No.: 13/055,296

(22) PCT Filed: Jul. 20, 2009

(86) PCT No.: PCT/CN2009/072826
§ 371 (c)(1),
(2), (4) Date: Jan. 21, 2011

(87) PCT Pub. No.: WO2010/009664
PCT Pub. Date: Jan. 28, 2010

(65) Prior Publication Data
US 2011/0126000 A1    May 26, 2011

(30) Foreign Application Priority Data
Jul. 23, 2008   (CN) .......................... 2008 1 0150433

(51) Int. Cl.
*H04L 29/06* (2006.01)
(52) U.S. Cl. ...................................... 713/155
(58) Field of Classification Search .................. 713/155
See application file for complete search history.

(56) References Cited

U.S. PATENT DOCUMENTS
7,548,152 B2 * 6/2009 Hillier .......................... 340/5.61
(Continued)

FOREIGN PATENT DOCUMENTS
CN            101103365 A     1/2008
(Continued)

OTHER PUBLICATIONS

IEEE Standard 802.11iTM-2004 for Information Technology—Telecommunications and information exchange between systems—Local and metropolitan area networks—Specific requirements, Part 11, Amendment 6, IEEE, New York, NY, Jul. 2004.
(Continued)

*Primary Examiner* — Jason Gee
(74) *Attorney, Agent, or Firm* — Harness, Dickey & Pierce, P.L.C.

(57) ABSTRACT

A method for accessing data safely, which is suitable for the electronic tag with low performance, is provided. The method comprises the following steps: when performing a data writing process, the first read-write device encrypts the message MSG and then writes the message in the electronic tag; when performing a data reading process, the second read-write device sends a data request packet to the electronic tag; the electronic tag sends a data response packet to the second read-write device according to the data request packet; the second read-write device sends a key request packet to a trusted third party; the trusted third party verifies the validity of the identity of the second read-write device according to the key request packet, and sends a key response packet to the second read-write device upon the verification is passed; the second read-write device obtains the plain text of the electronic tag message MSG according to the key response packet. This invention can realize the safe access of the data of the electronic tag with low performance.

6 Claims, 1 Drawing Sheet

U.S. PATENT DOCUMENTS

2008/0165005 A1* 7/2008 Burbridge et al. .......... 340/572.1
2010/0313012 A1* 12/2010 Pang et al. .................... 713/155

FOREIGN PATENT DOCUMENTS

| CN | 101170411 A | * | 3/2008 |
| CN | 101170411 A |   | 4/2008 |
| CN | 101350060 A |   | 1/2009 |

OTHER PUBLICATIONS

IEEE Standard 802,16e™-2005 and IEEE Standard 802.16™-2004/Cor1-2005 for Local and metropolitan area networks—Part 16: Air Interface for Fixed and Mobile Broadband Wireless Access Systems, Amendment 2 and Corrigendum 1, IEEE, New York, NY, Feb. 2006.
Telecommunications and Information Exchange Between Systems. ISO/IEC JTC 1/SC 6. Second working draft text for ISO/IEC WD 20011, Information technology—Telecommunications and information exchange between systems—Local and metropolitan area networks—Specific requirements—Part XX: Alternative security mechanism for use with ISO/IEC 8802-11. Mar. 17, 2011.

* cited by examiner

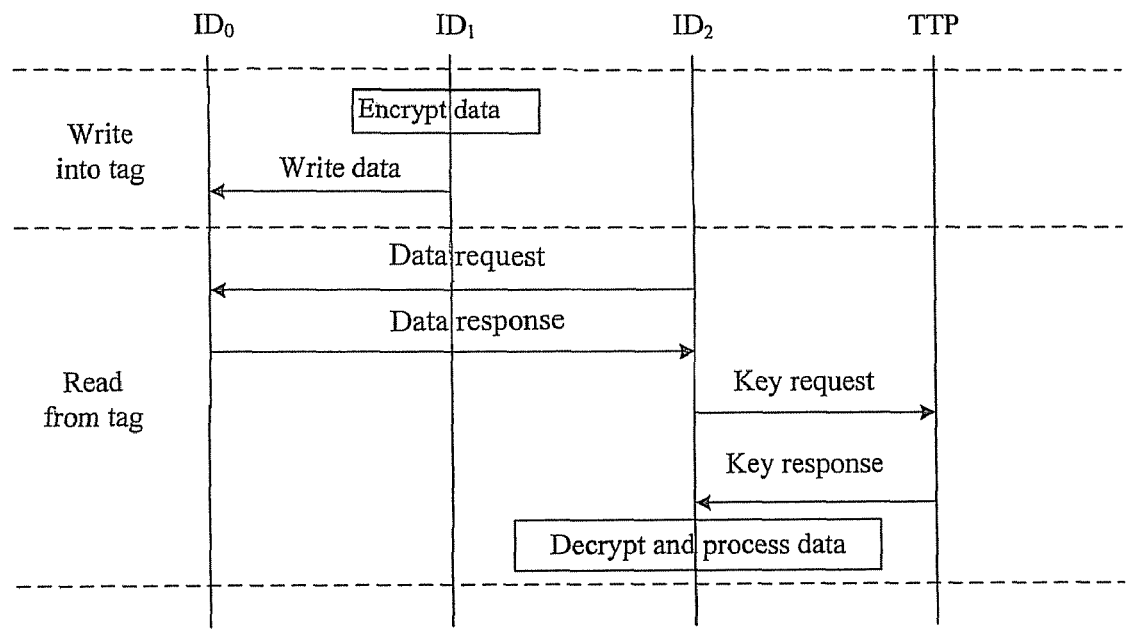

METHOD FOR ACCESSING DATA SAFELY SUITABLE FOR ELECTRONIC TAG

CROSS-REFERENCE TO RELATED APPLICATIONS

This application is a 371 U.S. National Stage of International Application No. PCT/CN2009/072826, filed Jul. 20, 2009. This application claims the priority to Chinese Patent Application No. 200810150433.X, filed with the Chinese Patent Office on Jul. 23, 2008 and entitled "METHOD FOR ACCESSING DATA SAFELY SUITABLE FOR ELECTRONIC TAG", which is hereby incorporated by reference in its entirety.

FIELD OF THE INVENTION

The present invention relates to a secured data access method for an electronic tag.

BACKGROUND OF THE INVENTION

The security issue of a wireless network, e.g., a wireless local area network, a wireless metropolitan area network, etc., is far more serious than a wired Ethernet. A Radio Frequency Identification (RFID) tag also suffers the security issue, and it is also necessary to address effectively the issue of privilege verification between a reader-writer and an electronic tag for safe communication in the RFID. If the electronic tag with a high performance is somewhat capable of calculation and processing, an existing secured access protocol of the wireless network may be used or referred to so as to address the issue of authentication and privilege verification between the electronic tag and the reader-writer. However, if the electronic tag is only capable of storing data but can not process any data by itself, it may be difficult in the traditional security protocol to ensure the security of the stored data.

In view of the use scenarios and application environments of electronic tags, the electronic tags can roughly be divided into three categories: (1) an advanced electronic tag, which is readable and writable and is somewhat provided with a memory space and a calculation capability; (2) an intermediate electronic tag, which is slightly inferior in performance but functionally similar to the advanced electronic tag; and (3) a low-grade electronic tag, which is only intended to record some data information to ensure that the information can be read or written by a reader-writer and is typically provided with neither data processing function nor calculation capability, e.g., a pre-charged billing card.

For the former two categories of electronic tags, the security of channels between the electronic tags and the readers-writers can be ensured in an authentication protocol. The third category of electronic tags is merely a medium for storing information, and is provided with neither calculation capability nor memory capability for calculation and without identity information, etc. Despite the low performance of the third category of electronic tags, there may be a high security requirement on the data information stored therein to ensure that the stored information can be read and decrypted by only an intended legal reader-writer; and alike information written by only the intended legal reader-writer can be accepted by another reader-writer. It is obviously infeasible to accommodate this security demand in the existing authentication solution.

In existing security solutions of wireless networks, e.g., IEEE802.11i for wireless local area networks, IEEE802.16e for wireless metropolitan area networks, the Chinese national standard WAPI for wireless local networks, there are fundamental performance requirements such as calculation and data processing, for respective parties involved in the protocols. The existing security solutions are more or less applicable to the former two categories of electronic tags but can not be applicable to the third category of electronic tags.

Therefore, there is a need of devising a new security solution to verify the identity and privilege of a reader-writer to ensure the security of data information for the third category of electronic tags.

SUMMARY OF THE INVENTION

The present invention provides a secured data access method for a low-performance electronic tag to solve the technical problem in the prior art of failing to secure information written to and read from the low-performance electronic tag.

A technical solution of the present invention lies in a secured data access method for a low-performance electronic tag. The method includes the following steps of:

in a process of writing data, encrypting and writing by a first reader-writer a message, MSG, into the electronic tag;

in a process of reading the data, transmitting by a second reader-writer a data request packet to the electronic tag, the data request packet is adapted to trigger the electronic tag to transmit a data response packet to the second reader-writer;

transmitting by the electronic tag to the second reader-writer the data response packet including an $ID_1$ field, a TTP field, a PKeyID field, a CP field, a CMSG field and an MIC field, wherein the $ID_1$ field is the identity of the first reader-writer writing the data, the TTP field is the identity of a trusted third party, the PKeyID field is a key identifier selected and written by the first reader-writer into the electronic tag, the CP field is a CP value equal to r·P calculated and written by the first reader-writer into the electronic tag with r being a secret random number selected by the first reader-writer and P being a generation element of $G_1$ in a q-order cyclic group, the CMSG field is a cipher text of the MSG written by the first reader-writer into the electronic tag, and the MIC field is an integrity check value, MIC, equal to $h(ID_1\|S_1\|PKeyID\|CMSG\|CP)$ calculated and written by the first reader-writer into the electronic tag with $S_1$ being a private key of the first reader-writer and h(x) being a unidirectional hash function;

transmitting by the second reader-writer to the trusted third party a key request packet comprising an $ID_2$ field, the TTP field, a Nonce field, the $ID_1$ field, the PKeyID field, the CP field, the CMSG field, the MIC field and an $MIC_1$ field, wherein the $ID_2$ field is the identity of the second reader-writer reading the data, the Nonce field is a one-time random number selected by the second reader-writer, and the $MIC_1$ field is a message integrity check value, $MIC_1$, calculated by the second reader-writer as $h(ID_2|S_2|TTP|Nonce|MIC)$ with $S_2$ being a private key of the second reader-writer;

verifying by the trusted third party the identities of the second reader-writer and the first reader-writer for validity respectively in response to the key request packet, and after the verification is passed, transmitting to the second reader-writer a key response packet comprising the $ID_2$ field, the TTP field, a CSkeyID field, a $CP_1$ field, the Nonce field and an $MIC_2$ field, wherein the $CP_1$ field is a $CP_1$ value equal to $r_1·P$ calculated and transmitted by the trusted third party to the second reader-writer with $r_1$ being a secret random number selected by the trusted third party; and deriving by the second reader-writer a plain text of the MSG of the electronic tag from the key response packet.

Preferably, before the process of writing the data, the method further includes: creating system parameters by the trusted third party;

wherein the system parameters comprise two q-order cyclic groups ($G_1$, +) and ($G_2$, ·), the generation element P of $G_1$, a value e resulting from bilinear transform on $G_1$ and $G_2$, i.e., $e:G_1 \times G_1 \rightarrow G_2$, a private key $S_{TTP} \in Z^*_q$ selected randomly by the trusted third party for itself and a corresponding public key $Q_{TTP}=S_{TTP}\cdot P \in G_1$, an encryption key K to encrypt a message m in a symmetric encryption algorithm, and the unidirectional hash function h(x).

Preferably, encrypting and writing the MSG by the first reader-writer into the electronic tag includes:

selecting by the first reader-writer randomly the key identifier PKeyID as a public key;

selecting by the first reader-writer the secret random number r and calculating $K=r \cdot Q_{TTP} \cdot PKeyID$;

encrypting by the first reader-writer the MSG by $CMSG=E_K(MSG)$ into a cipher text CMSG, and calculating $CP=r \cdot P$ and the message integrity check value $MIC=h(ID_1 \| S_1 \| TTP \| PKeyID \| CMSG \| CP)$; and writing by the first reader-writer $ID_1$, TTP, CP, PKeyID, CMSG and MIC together into the electronic tag.

Preferably, verifying by the trusted third party the identities of the second reader-writer and the first reader-writer for validity respectively in response to the key request packet includes:

verifying the identity of the second reader-writer for validity, and if the identity of the second reader-writer is invalid, terminating the protocol;

if the identity of the second reader-writer is valid, calculating the private key $S_2$ of the second reader-writer, recalculating the $MIC_1$, and comparing the recalculated $MIC_1$ with the received $MIC_1$;

if the recalculated $MIC_1$ is unequal to the received $MIC_1$, terminating the protocol;

if the recalculated $MIC_1$ is equal to the received $MIC_1$, verifying the identity of the first reader-writer for validity;

if the identity of the first reader-writer is invalid, terminating the protocol; and if the identity of the first reader-writer is valid, calculating the private key $S_1$ of the first reader-writer, recalculating the MIC and comparing the recalculated MIC with the received MIC, and if the recalculated MIC is equal to the received MIC, terminating the protocol; if the recalculated MIC is unequal to the received MIC, transmitting the key response packet to the second reader-writer.

Preferably, deriving by the second reader-writer the plain text of the MSG of the electronic tag from the key response packet comprises:

verifying by the second reader-writer whether Nonce is the random number selected by the second reader-writer upon reception of the key response packet, and if Nonce is not the random number selected by the second reader-writer, stopping the protocol due to an error;

if Nonce is the random number selected by the second reader-writer, recalculating $K_1=CP_1 \cdot S_2$, deriving an encryption key EK and an integrity check key IK from $K_1$, recalculating the $MIC_2$ from IK, and comparing the recalculated $MIC_2$ with the received $MIC_2$ to verify the key response packet for validity, and if the key response packet is valid, decrypting CSKeyID using EK into a plain text of SKeyID, calculating $K=CP \cdot SKeyID$ from the contents of the data response packet, and decrypting the cipher text CMSG using K as a key into the plain text of MSG.

The present invention has the following advantages:

1. An identity-based public mechanism is offered without maintenance of any PKI as done for a traditional public key.

2. No digital certificate will be transported during authentication to thereby save a communication overhead.

3. An identity verification function is added to obviate the difficulty of verifying an identity for validity in the identity-based public mechanism.

4. Identity authentication and privilege verification is performed between respective reader-writers so that data stored in only a legal reader-writer can be accepted by another reader-writer, and alike only the legal reader-writer can be authorized to read and decrypt data information stored in the other reader-writer.

5. A bilinear pair on an elliptical curve is adopted to thereby shorten the length of secured data without degrading the security thereof, thus greatly improving the performance of calculation and communication.

BRIEF DESCRIPTION OF THE DRAWINGS

FIG. 1 illustrates a schematic flow chart of an embodiment of a secured data access method for an electronic tag according to the present invention.

DETAILED DESCRIPTION OF THE INVENTION

The method according to the present invention is performed by a Trusted Third Party (TTP), e.g., an authentication server or another authentication-enabled device, which is responsible for physical verification of the identity of a user entity, generation of system parameters, creation of user parameters, etc.

Referring to FIG. 1, an embodiment of the method according to the present invention is implemented as follows:

1) Firstly, the trusted third party creates system parameters including two q-order cyclic groups ($G_1$, +) and ($G_2$, ·); a generation element P of $G_1$, a value e resulting from bilinear transform on $G_1$ and $G_2$, i.e., $e:G_1 \times G_1 \rightarrow G_2$, a private key $S_{TTP} \in Z^*_q$ selected randomly by the trusted third party for itself and a corresponding public key $Q_{TTP}=S_{TTP} \cdot P \in G_1$, $E_K(m)$ which represents encryption of a message m in a symmetric encryption algorithm with an encryption key K, and h(x) which represents a unidirectional hash function.

Identifiers $ID_1$ and $ID_2$ of a first reader-writer and a second reader-writer are their public keys respectively, and their private keys are $S_1=S_{TTP} \cdot ID_1$ and $S_2=S_{TTP} \cdot ID_2$ respectively. No pair of public and private keys will be calculated for an electronic tag $ID_0$.

This step is performed only in an initial application to create the system parameters and will not be performed in subsequent repeated applications after the creation.

2) A process of writing data: either of the reader-writer, e.g., the first reader-writer, encrypts a message MSG and then writes the encrypted MSG into the electronic tag, where the MSG is encrypted as follows:

Firstly, the first reader-writer selects randomly a key identifier PKeyID as a public key, then selects a secret random number r and calculates $K=r \cdot Q_{TTP} \cdot PKeyID$, next encrypts the MSG using K into a cipher text, that is, calculates $CMSG=E_K(MSG)$, and also calculates $CP=r \cdot P$ and a message integrity check value $MIC=h(ID_1 \| S_1 \| TTP \| PKeyID \| CMSG \| CP)$, and finally writes $ID_1$, TTP, CP, PKeyID, CMSG and MIC together into the electronic tag.

Thus, the first reader-writer $ID_1$ securely writes the MSG into the electronic tag.

3) A process of reading data, which includes two sub-processes of retrieving data and of retrieving a key. The sub-process of retrieving data involves two packets of a data request and a data response, and the sub-process of retrieving a key involves two packets of a key request and a key response. Detailed description is given below:

3.1) The second reader-writer transmits the data request packet to the electronic tag, where the data request packet is null.

3.2) The electronic tag transmits the data response packet to the second reader-writer in response to the data request packet;

Where the data response packet includes the following contents:

| $ID_1$ | TTP | PKeyID | CP | CMSG | MIC |
|---|---|---|---|---|---|

Where:

The $ID_1$ field: the identity of the first reader-writer $ID_1$ writing the data information;

The TTP field: the identity of the trusted third party;

The PKeyID field: the PKeyID value selected and written by the first reader-writer $ID_1$ into the electronic tag;

The CP field: the CP value equal to r·P calculated and written by the first reader-writer $ID_1$ into the electronic tag;

The CMSG field: the cipher text of the MSG written by the first reader-writer $ID_1$ into the electronic tag; and The MIC field: the MIC value equal to $h(ID_1\|S_1\|PKeyID\|CMSG\|CP)$ calculated and written by the first reader-writer $ID_1$ into the electronic tag.

2.3) The second reader-writer transmits the key request packet to the trusted third party;

Where the data request packet includes the following contents:

| $ID_2$ | TTP | Nonce | $ID_1$ | PKeyID | CP | CMSG | MIC | $MIC_1$ |
|---|---|---|---|---|---|---|---|---|

Where:

The $ID_2$ field: the identity of the second reader-writer $ID_2$ reading the data information;

The TTP field: the identity of the trusted third party;

The Nonce field: a one-time random number selected by the second reader-writer $ID_2$;

The $ID_1$ field: the identity of the first reader-writer $ID_1$ writing the data information;

The PKeyID field: the PKeyID value selected and written by the first reader-writer $ID_1$ into the electronic tag;

The CP field: the CP value calculated and written by the first reader-writer $ID_1$ into the electronic tag;

The CMSG field: the cipher text of the MSG written by the first reader-writer $ID_1$ into the electronic tag;

The MIC field: the MIC value calculated and written by the first reader-writer $ID_1$ into the electronic tag; and The $MIC_1$ field: a message integrity check value calculated by the second reader-writer $ID_2$ as $h(ID_2\|S_2\|TTP\|Nonce\|MIC)$;

The trusted third party can verify the identity of the second reader-writer for validity upon reception of the key request packet from the second reader-writer. If the identity is invalid, the protocol is terminated; otherwise, the TTP calculates a private key $S_2$ of the second reader-writer, recalculates the $MIC_1$ and compares the recalculated $MIC_1$ value with the received $MIC_1$ value. If the recalculated $MIC_1$ value and the received $MIC_1$ value are unequal, the protocol is terminated; otherwise, the TTP verifies the identity of the first reader-writer for validity. If the identity of the first reader-writer is invalid, the protocol is terminated; otherwise, the TTP calculates a private key $S_1$ of the first reader-writer, recalculates the MIC value and compares the MIC value with the received MIC value. If the recalculated MIC value and the received MIC value are unequal, the protocol is terminated; otherwise, the TTP constructs the key response packet and transmits the key response packet to the second reader-writer.

2.4) The trusted third party transmits the key response packet to the second reader-writer in response to the key request packet.

Where the data response packet includes the following contents:

| $ID_2$ | TTP | CSKeyID | $CP_1$ | Nonce | $MIC_2$ |
|---|---|---|---|---|---|

Where:

The $ID_2$ field: the identity of the second reader-writer $ID_2$ reading the data information;

The TTP field: the identity of the trusted third party;

The CSkeyID field: a cipher text of a key SKeyID as requested, which is calculated as follows: the trusted third party firstly calculates $SKeyID=S_{TTP}·PKeyID$, then selects a secret random number $r_1$, calculates $K_1=r_1·Q_{TTP}·ID_2$ and derives an encryption key EK and an integrity check key IK from $K_1$, and then encrypts SKeyID using EK into the cipher text CSkeyID, that is, calculates $CSKeyID=E_{EK}(SKeyID)$;

The $CP_1$ field: $CP_1=r_1·P$;

The Nonce field: the one-time random number selected by the second reader-writer; and The $MIC_2$ field: a message integrity check value calculated on all the fields preceding this field using the integrity check key IK derived from $K_1$;

The second reader-writer verifies whether the Nonce in the key response packet is the random number selected by itself. If the Nonce in the key response packet is not the random number selected by itself, the protocol is stopped due to an error; otherwise, the second reader-writer recalculates $K_1=CP_1·S_2$ and derives therefrom the encryption key EK and the integrity check key IK and can recalculate from IK the $MIC_2$ value and compare the recalculated $MIC_2$ value with received $MIC_2$ to verify the packet for validity. If it is verified as being valid, the second reader-writer decrypts CSKeyID using EK into a plain text of SKeyID, calculates K=CP·SKeyID from the contents of the data response packet after deriving the SKeyID, and finally decrypts CMSG using K as a key into a plain text of MSG.

With the foregoing protocol, the function of secured writing into the electronic tag by the reader-writer can be performed in the step 2), and the function of secured reading from the electronic tag by the reader-writer can be performed in the step 3). Also the function of verifying the reader-writer for both validity of its identity and its privilege can be preformed in the verification function of the trusted third party.

The step 2) can be performed if the second reader-writer as necessary needs to write the processed data information into the electronic tag after deriving the plain text information and correspondingly processing the plain text information on the data information of the electronic tag.

REFERENCE LIST $ID_0$: identity information of the electronic tag
$ID_1$: identity information of the first reader-writer;
$ID_2$: identity information of the second reader-writer;
Nonce: a one-time random number;
PKeyID: a key identifier used as a public key;
SKeyID: a private key corresponding to PKeyID; and
MSG: a message written into the electronic tag.

The invention claimed is:

1. A secured data access method for a low-performance electronic tag, comprising the steps of:
   in a process of writing data, encrypting and writing by a first reader-writer a message, MSG, into the electronic tag;
   in a process of reading the data, transmitting by a second reader-writer a data request packet to the electronic tag, the data request packet is adapted to trigger the electronic tag to transmit a data response packet to the second reader-writer;
   transmitting by the electronic tag to the second reader-writer the data response packet comprising an $ID_1$ field, a TTP field, a PKeyID field, a CP field, a CMSG field and an MIC field, wherein the $ID_1$ field is the identity of the first reader-writer writing the data, the TTP field is the identity of a trusted third party, the PKeyID field is a key identifier selected and written by the first reader-writer into the electronic tag, the CP field is a CP value equal to $r \cdot P$ calculated and written by the first reader-writer into the electronic tag with r being a secret random number selected by the first reader-writer and P being a generation element of $G_1$ in a q-order cyclic group, the CMSG field is a cipher text of the MSG written by the first reader-writer into the electronic tag, and the MIC field is an integrity check value, MIC, equal to $h(ID_1\|S_1\|PKeyID\|CMSG\|CP)$ calculated and written by the first reader-writer into the electronic tag with $S_1$ being a private key of the first reader-writer and $h(x)$ being a unidirectional hash function;
   transmitting by the second reader-writer to the trusted third party a key request packet comprising an $ID_2$ field, the TTP field, a Nonce field, the $ID_1$ field, the PKeyID field, the CP field, the CMSG field, the MIC field and an $MIC_1$ field, wherein the $ID_2$ field is the identity of the second reader-writer reading the data, the Nonce field is a one-time random number selected by the second reader-writer, and the $MIC_1$ field is a message integrity check value, $MIC_1$, calculated by the second reader-writer as $h(ID_2\|S_2\|TTP\|Nonce\|MIC)$ with $S_2$ being a private key of the second reader-writer;
   verifying by the trusted third party the identities of the second reader-writer and the first reader-writer for validity respectively in response to the key request packet, and after the verification is passed, transmitting to the second reader-writer a key response packet comprising the $ID_2$ field, the TTP field, a CSkeyID field, a $CP_1$ field, the Nonce field and an $MIC_2$ field, wherein the $CP_1$ field is a $CP_1$ value equal to $r_1 \cdot P$ calculated and transmitted by the trusted third party to the second reader-writer with $r_1$ being a secret random number selected by the trusted third party; and
   deriving by the second reader-writer a plain text of the MSG of the electronic tag from the key response packet.

2. The method according to claim 1, wherein before the process of writing the data, the method further comprises: creating system parameters by the trusted third party;
   wherein the system parameters comprise two q-order cyclic groups $(G_1, +)$ and $(G_2, \cdot)$, the generation element P of $G_1$, a value e resulting from bilinear transform on $G_1$ and $G_2$, i.e., $e: G_1 \times G_1 \to G_2$, a private key $S_{TTP} \in Z^*_q$ selected randomly by the trusted third party for itself and a corresponding public key $Q_{TPP} = S_{TTP} \cdot P \in G_1$, encryption key K to encrypt a message m in a symmetric encryption algorithm, and the unidirectional hash function $h(x)$.

3. The method according to claim 1, wherein encrypting and writing the MSG by the first reader-writer into the electronic tag comprises:
   selecting by the first reader-writer randomly the key identifier PKeyID as a public key;
   selecting by the first reader-writer the secret random number r and calculating $K = r \cdot Q_{TTP} \cdot PKeyID$;
   encrypting by the first reader-writer the MSG by $CMSG = E_K(MSG)$ into a cipher text CMSG, and calculating $CP = r \cdot P$ and the message integrity check value $MIC = h(ID_1\|S_1\|TTP\|PKeyID\|CMSG\|CP)$; and
   writing by the first reader-writer $ID_1$, TTP, CP, PKeyID, CMSG and MIC together into the electronic tag.

4. The method according to claim 1, wherein verifying by the trusted third party the identities of the second reader-writer and the first reader-writer for validity respectively in response to the key request packet comprises:
   verifying the identity of the second reader-writer for validity, and if the identity of the second reader-writer is invalid, terminating the protocol;
   if the identity of the second reader-writer is valid, calculating the private key $S_2$ of the second reader-writer, recalculating the $MIC_1$, and comparing the recalculated $MIC_1$ with the received $MIC_1$;
   if the recalculated $MIC_1$ is unequal to the received $MIC_1$, terminating the protocol;
   if the recalculated $MIC_1$ is equal to the received $MIC_1$, verifying the identity of the first reader-writer for validity;
   if the identity of the first reader-writer is invalid, terminating the protocol; and
   if the identity of the first reader-writer is valid, calculating the private key $S_1$ of the first reader-writer, recalculating the MIC and comparing the recalculated MIC with the received MIC, and if the recalculated MIC is equal to the received MIC, terminating the protocol; if the recalculated MIC is unequal to the received MIC, transmitting the key response packet to the second reader-writer.

5. The method according to claim 1, wherein deriving by the second reader-writer the plain text of the MSG of the electronic tag from the key response packet comprises:
   verifying by the second reader-writer whether Nonce is the random number selected by the second reader-writer upon reception of the key response packet, and if Nonce is not the random number selected by the second reader-writer, stopping the protocol due to an error;
   if Nonce is the random number selected by the second reader-writer, recalculating $K_1 = CP_1 \cdot S_2$, deriving an encryption key EK and an integrity check key IK from $K_1$, recalculating the $MIC_2$ from IK, and comparing the recalculated $MIC_2$ with the received $MIC_2$ to verify the key response packet for validity, and if the key response packet is valid, decrypting CSKeyID using EK into a plain text of SKeyID, calculating $K = CP \cdot SKeyID$ from the contents of the data response packet, and decrypting the cipher text CMSG using K as a key into the plain text of MSG.

6. The method according to claim 2, wherein encrypting and writing the MSG by the first reader-writer into the electronic tag comprises:
   selecting by the first reader-writer randomly the key identifier PKeyID as a public key;
   selecting by the first reader-writer the secret random number r and calculating $K = r \cdot Q_{TTP} \cdot PKeyID$;
   encrypting by the first reader-writer the MSG by $CMSG = E_K(MSG)$ into a cipher text CMSG, and calculating $CP = r \cdot P$ and the message integrity check value $MIC = h(ID_1\|S_1\|TTP\|PKeyID\|CMSG\|CP)$; and
   writing by the first reader-writer $ID_1$, TTP, CP, PKeyID, CMSG and MIC together into the electronic tag.

* * * * *